US008891025B2

(12) United States Patent
Akita et al.

(10) Patent No.: US 8,891,025 B2
(45) Date of Patent: Nov. 18, 2014

(54) INFORMATION PROCESSING DEVICE

(75) Inventors: Masashi Akita, Osaka (JP); Takuma Masuda, Osaka (JP); Kazuya Okabe, Osaka (JP); Shinichi Harigae, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/988,635

(22) PCT Filed: Feb. 17, 2011

(86) PCT No.: PCT/JP2011/000886
§ 371 (c)(1),
(2), (4) Date: May 21, 2013

(87) PCT Pub. No.: WO2012/070161
PCT Pub. Date: May 31, 2012

(65) Prior Publication Data
US 2013/0242206 A1    Sep. 19, 2013

(30) Foreign Application Priority Data
Nov. 24, 2010    (JP) ................................ 2010-260866

(51) Int. Cl.
| H04N 5/44 | (2011.01) |
| G09G 5/00 | (2006.01) |
| G06F 3/048 | (2013.01) |
| G06F 3/033 | (2013.01) |
| H04N 21/422 | (2011.01) |
| G06F 3/01 | (2006.01) |
| H04N 21/442 | (2011.01) |
| G06F 3/0488 | (2013.01) |

(52) U.S. Cl.
CPC .......... *G06F 3/017* (2013.01); *H04N 21/42201* (2013.01); *H04N 5/4403* (2013.01); *G06F 3/04883* (2013.01); *H04N 21/44218* (2013.01)
USPC .............. 348/734; 345/156; 345/8; 715/810; 715/863

(58) Field of Classification Search
CPC .......... H04N 5/4403; H04N 21/42201; H04N 21/44218; G06F 3/017
See application file for complete search history.

(56) References Cited

U.S. PATENT DOCUMENTS

| 6,346,929 B1 * | 2/2002 | Fukushima et al. ............... 345/8 |
| 2008/0052643 A1 * | 2/2008 | Ike et al. ....................... 715/863 |

(Continued)

FOREIGN PATENT DOCUMENTS

| JP | 2005-063090 A | 3/2005 |
| JP | 2008-052590 A | 3/2008 |

(Continued)

OTHER PUBLICATIONS

International Search Report for corresponding International Application No. PCT/JP2011/000886 mailed May 24, 2011.

(Continued)

*Primary Examiner* — Jefferey Harold
*Assistant Examiner* — Sean Haiem
(74) *Attorney, Agent, or Firm* — Renner, Otto, Boisselle & Sklar, LLP

(57) ABSTRACT

An information processing device according to the present invention receives an operation instruction by a motion of a hand and thus performs an operation corresponding thereto. The information processing device includes a detection section for detecting the motion of the hand; and a control section for displaying information corresponding to the motion of the hand detected by the detection section on a display. When the detection first detects the hand, the control section performs one of a plurality of different processes in accordance with whether or not the detection section detects a motion of the hand within a certain time duration after the first detection of the hand.

9 Claims, 5 Drawing Sheets

(56) References Cited

U.S. PATENT DOCUMENTS

| | | |
|---|---|---|
| 2010/0283730 A1 | 11/2010 | Miyazaki |
| 2012/0026083 A1* | 2/2012 | Okada .......................... 345/156 |
| 2012/0124516 A1* | 5/2012 | Friedman ..................... 715/810 |

FOREIGN PATENT DOCUMENTS

| | | |
|---|---|---|
| JP | 2010-154405 A | 7/2010 |
| JP | 2010-211735 A | 9/2010 |
| JP | 2010-250492 A | 11/2010 |
| WO | WO 2010/095204 A1 | 8/2010 |

OTHER PUBLICATIONS

Form PCT/ISA/237 for corresponding International Application No. PCT/JP2011/000886 dated May 24, 2011 and partial English translation.

* cited by examiner

INFORMATION PROCESSING DEVICE

TECHNICAL FIELD

The present invention relates to an information processing device which recognizes a motion of a hand as a gesture by use of a non-contact sensor and is operable based on the gesture as the recognition result.

BACKGROUND ART

A conventionally known information processing device operable by a gesture operates as follows. A hand is moved in front of a video camera. The information processing device recognizes a movement and a shape of the hand based on the video input to the video camera, and controls a control target device based on the recognition result.

Patent Document 1 discloses an interface device for recognizing a movement and a shape of a hand input to a video camera and allowing a user to make an operation while checking a list of gestures displayed together with a menu screen.

CITATION LIST

Patent Literature

Patent Document 1: Japanese Laid-Open Patent Publication No. 2008-052590

SUMMARY OF INVENTION

Technical Problem

However, a conventional information processing device provides no feedback to a gesture operation made by a user and thus has a problem of not providing a sense of operation.

The present invention made to solve the above-described problem has an object of providing an information processing device for displaying a feedback screen to an operation made by a gesture so as to provide a user with a sense of operation.

Solution to Problem

An information processing device according to the present invention receives an operation instruction by a motion of a hand and thus performs an operation corresponding thereto. The information processing device includes a detection section for detecting a motion of the hand; and a control section for displaying information corresponding to the motion of the hand detected by the detection section on a display. When the detection section first detects the hand, the control section performs one of a plurality of different processes in accordance with whether or not the detection section detects a motion of the hand within a certain time duration after the first detection.

Owing to such a structure, the information processing device gives the user a feedback to a gesture operation, so that the user can make the gesture operation with a sense of operation.

Advantageous Effects of Invention

According to the above-described structure, an information processing device for displaying a feedback screen so as to allow a user to make a gesture operation with a sense of operation.

DESCRIPTION OF EMBODIMENTS

Hereinafter, an information processing device in an embodiment according to the present invention will be described.

Figure 1:
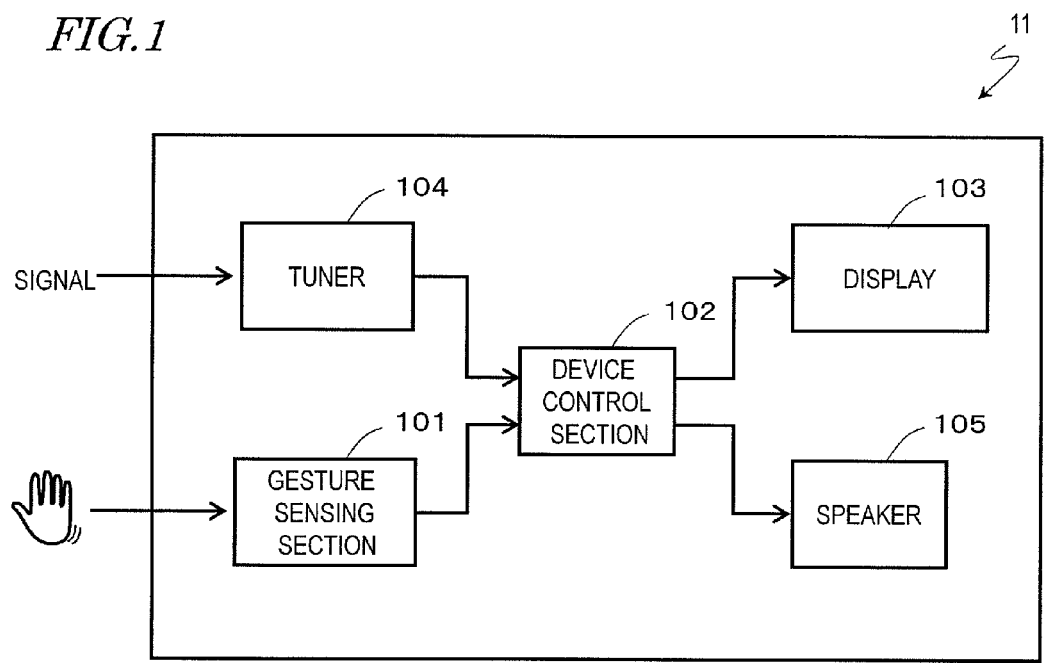
FIG. 1 is a block diagram showing an information processing device in an embodiment according to the present invention.

FIG. 1 is a block diagram of an information processing device in an embodiment according to the present invention. An information processing device 11 includes a gesture sensing section (detection section) 101, a device control section (control section) 102, a display (display section) 103, a tuner 104, and a speaker 105.

Figure 2:
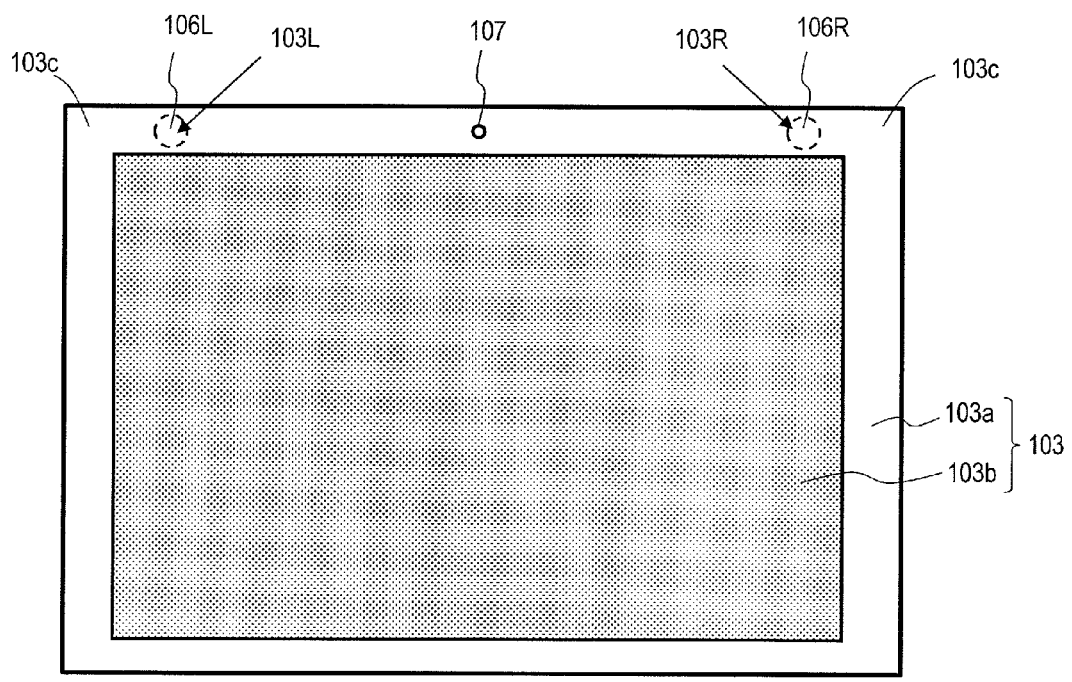
FIG. 2 is a plan view of a display section of the information processing device shown in FIG. 1.

FIG. 2 is a plan view of the display 103. The display 103 includes a display area 103b and a frame 103a located around the display area 103b.

The gesture sensing section 101 detects a hand and a motion of the hand. For this purpose, as shown in FIG. 2, the gesture sensing section 101 includes, for example, two infrared LEDs 106L and 106R, and an infrared sensor 107. The two infrared LEDs 106L and 106R and the infrared sensor 107 are located in, for example, a part of the frame 103a that is above the display area 103b. More specifically, the two infrared LEDs 106L and 106R are provided at a first position 103L and a second position 103R which are slightly inner to corners 103c of the frame 103a. The infrared sensor 107 is provided at a position which is approximately the center between the first position 103L and the second position 103R. In this embodiment, the first position 103L and the second position 103R are slightly inner to the corners 103c of the frame 103a. Alternatively, the first position 103L and the second position 103R may be at the corners 103c. Hereinafter, the infrared LED 106L located at the first position 103L may be referred to as the "left infrared LED 106L", and the infrared LED 106R located at the second position 103R may be referred to as the "right infrared LED 106R".

Infrared rays emitted from the two infrared LEDs 106L and 106R are blocked and reflected by the hand, and are incident on the infrared sensor 107 located at an intermediate position between the two infrared LEDs 106L and 106R. Based on the information on the infrared rays incident on the infrared sensor 107, the hand is detected, and also the position and motion of the hand are detected. For example, the left infrared LED 106L and the right infrared LED 106R emit optical signals of different phases, cycles and pulse timings from each other. As a result, the infrared sensor 107 can distinguish the infrared rays emitted from the left infrared LED 106L and reflected by the hand from the infrared rays emitted from the right infrared LED 106R and reflected by the hand can be distinguished, when detecting the infrared rays. Therefore, whether the hand is fixed (still) at the first position 103L or fixed at the second position 103R can be detected. When the hand is moved between the first position 103L and the second position 103R, the infrared rays from one of the left infrared LED 106L and the right infrared LED 106R are detected, then the infrared rays from both of the LEDs are detected, and then the infrared rays from the other of the left infrared LED 106L and the right infrared LED 106R are detected. By contrast, when no infrared rays are detected from the left infrared LED 106L or the right infrared LED 106R, the hand is not located at the first position 103L, at the second position 103R or between the first position 103L and the second position 103R. Thus, no hand is detected. The gesture sensing section 101 outputs a signal indicating such detection results to the device control section 102.

The gesture sensing section 101 can detect, for example, the presence of the hand, and the position and motion of the hand, located in the range of about 5 cm to 15 cm from a surface of the frame 103a. The detection is made, for example, at a certain time interval, for example, at an interval of 10 milliseconds to 100 milliseconds. It is preferable that the gesture sensing section 101 senses the hand in the state where the hand is out of contact with the frame 103a.

As described later in detail, the device control section 102 determines which of the two gestures of a "fixed" (still) gesture and a "moving" gesture is assumed by the hand, based on the potion and motion of the hand detected by the gesture sensing section 101. During the detection of the hand by the gesture sensing section 101, the device control section 102 displays information indicating the detection of the hand in the display area 103b and also displays information corresponding to the motion of the hand within a prescribed time duration after the hand starts to be detected in the display area 103a, while controlling the tuner 104, which is a target device, in accordance with the motion of the hand.

The display 103 displays a video signal received by the tuner 104 described later, and displays information regarding the gesture determined on by the device control section 102. In this embodiment, the information processing device 11 includes the display 103 as an element thereof. Alternatively, the display 103 may be an external device connectable to the information processing device.

The tuner 104 receives a video signal or an audio signal. The device control section 102 processes the video signal or the audio signal, and thus outputs the video signal to the display 103 and outputs the audio signal to the speaker 105. In this embodiment, the tuner 104 is included as a target device to be controlled by the device control section 102. Alternatively, the target device may be a player for playing a content stored on a disc such as a DVD, a BD or the like or on an SD card.

The information processing device 11 may further include another input device such as a remote control, a keyboard, a touch panel, a mouse or the like so as to be operated in a precise manner by a method other than the method of using a motion of a hand as described above.

The information processing device 11 in this embodiment handles the following two gestures.

(1) "Fixed" Gesture

Figure 3:
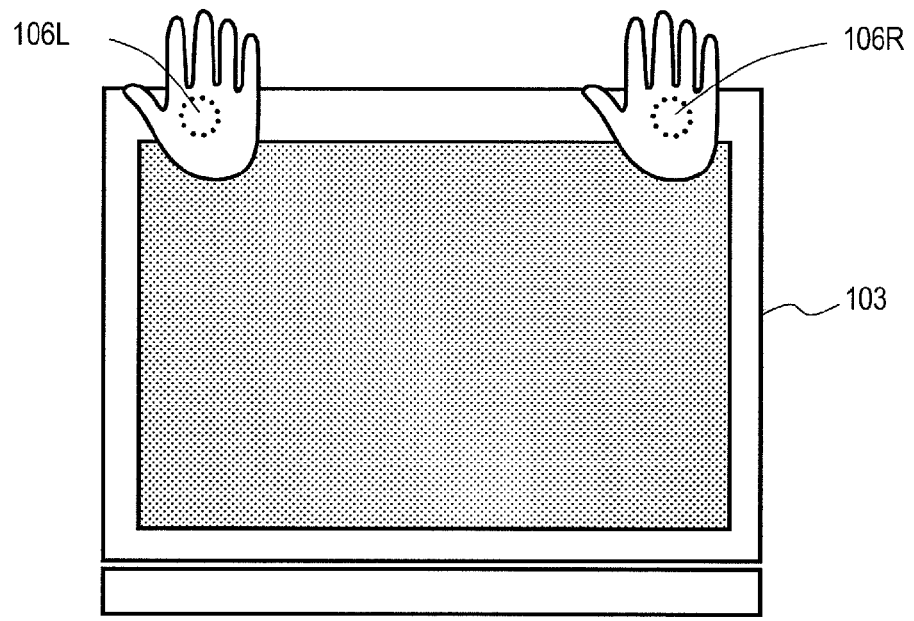
FIG. 3 shows an example of a "fixed" gesture.

FIG. 3 shows a motion of a hand in a "fixed" gesture.

In this embodiment, when a hand is kept held in front of either one of the two infrared LEDs 106L and 106R for, for example, at least 1 second, the motion of the hand is regarded as the "fixed" gesture.

Figure 9:
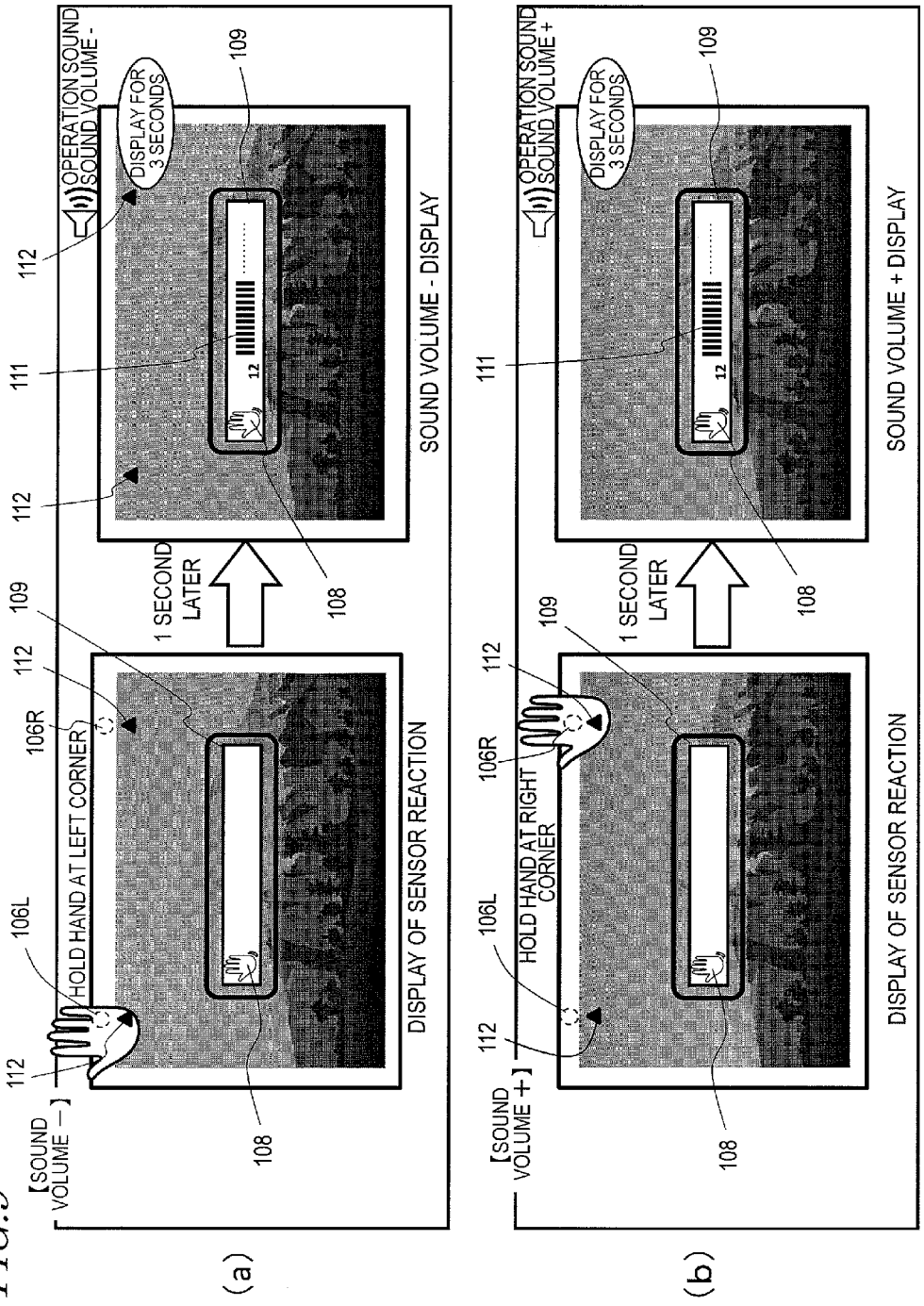
FIGS. 9(a) and 9(b) show a sound volume changing process.

As shown in, for example, FIG. 9(*a*), while a TV broadcast is viewed, a hand may be kept fixed in front of the left infrared LED 106L. In this case, an operation of turning down the volume of a sound is performed so as to decrease the volume of the sound which is output from the speaker 105.

As shown in, for example, FIG. 9(*b*), a hand may be kept fixed in front of the right infrared LED 106R. In this case, an operation of turning up the volume of the sound is performed so as to increase the volume of the sound which is output from the speaker 105. In this embodiment, the time duration until it is determined that the motion of the hand is the "fixed" gesture is 1 second. The present invention is not limited to this.

(2) "Moving" Gesture

Figure 4:
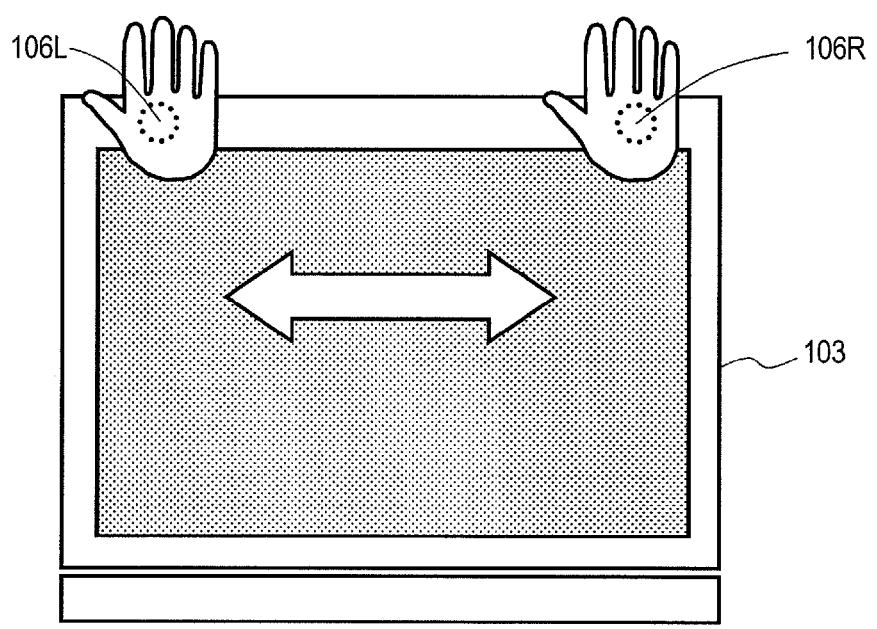
FIG. 4 shows an example of a "moving" gesture.

FIG. 4 shows a motion of a hand in a "moving" gesture.

In this embodiment, when a hand is moved from one of the two infrared LEDs 106L and 106R to the other thereof, the motion of the hand is regarded as the "moving" gesture.

Figure 10:
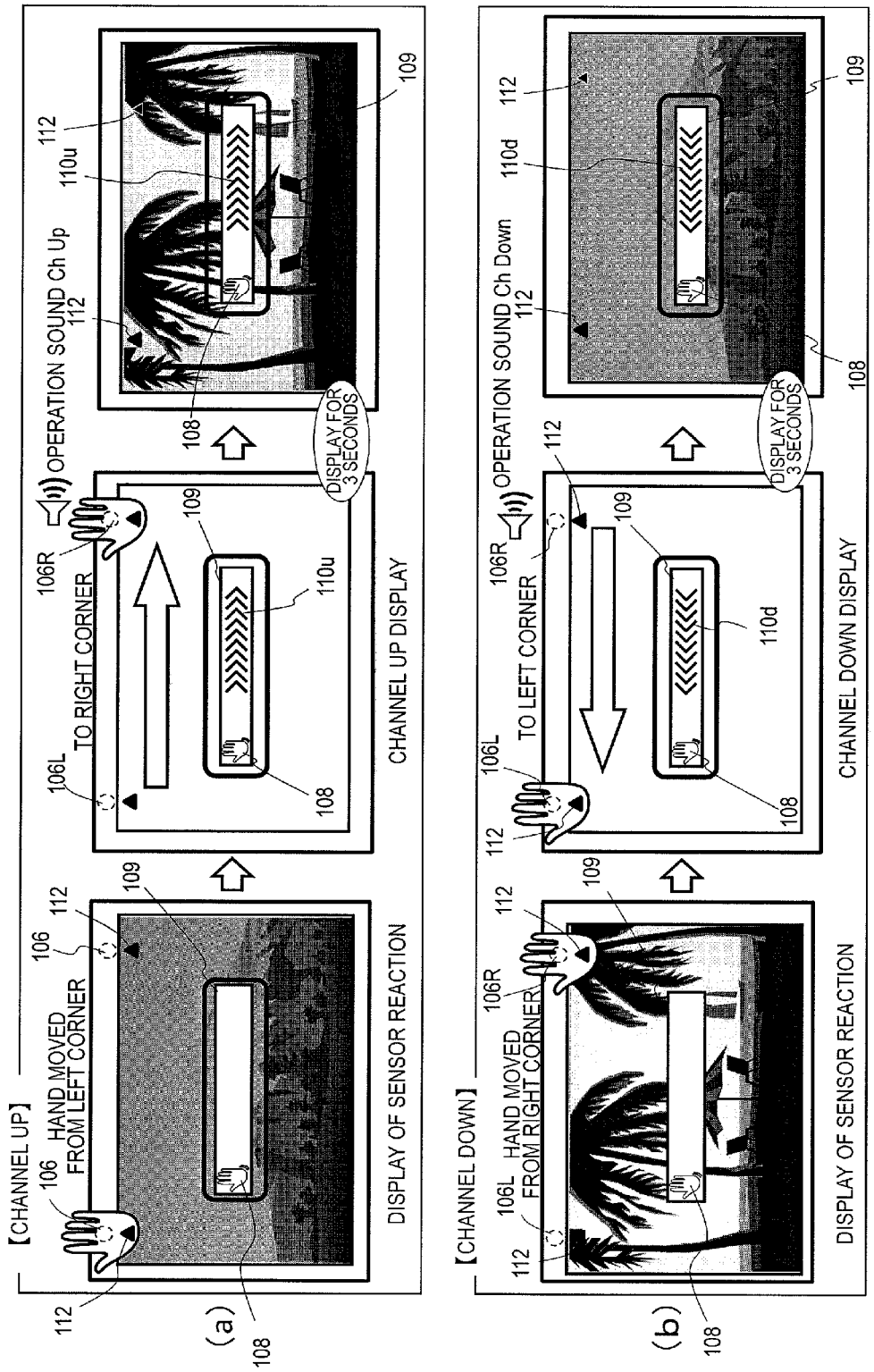
FIGS. 10(a) and 10(b) show a channel selection process.

As shown in, for example, FIG. 10(*a*), while a TV broadcast is viewed, a hand may be moved from the left infrared LED 106L to the right infrared LED 106R. In this case, a channel next to the channel which is currently viewed is selected in a direction, for example, in which the channel number is increased. As shown in, for example, FIG. 10(*b*), a hand may be moved from the right infrared LED 106R to the left infrared LED 106L. In this case, a channel previous (next) to the channel which is currently viewed is selected in a direction, for example, opposite to the direction in which the channel number is increased, namely, in a direction in which the channel number is decreased.

Now, a method by which the device control section 102 determines whether the motion of the hand is the "fixed" gesture or the "moving" gesture will be described.

First, the gesture sensing section 101 issues, to the device control section 102, either one of five sensor events of "sensing right", "sensing left", "moving from left to right", "moving from right to left", and "not sensing" in accordance with the motion of the hand. The device control device 102 receives such a sensor event and thus can learn the motion of the hand made by a user. In this embodiment, the method of determining the gesture is described as a processing method by use of an event. The processing method is not limited to using an event and may be a method of storing a state.

(1) "Sensing Right" Sensor Event

Upon sensing that the user's hand is held in front of the right infrared LED 106R, the gesture sensing section 101 issues the "sensing right" sensor event to the device control section 102.

When receiving no other sensor event for a prescribed time duration, for example, at least 1 second, after receiving the "sensing right" sensor event, the device control section 102 determines that the user's hand is fixed in front of the right infrared LED 106R. In this embodiment, as an operation corresponding to such a fixed state, a process of increasing the volume of the sound which is output from the speaker 105 is performed. Until receiving the "not sensing" sensor event from the gesture sensing section, the device control section 102 repeats the operation corresponding to the fixed state in front of the right infrared LED 106R at an interval of a prescribed time duration, for example, every second. Namely, the device control section 102 keeps increasing the volume of the sound which is output from the speaker 105.

(2) "Sensing Left" Sensor Event

Upon sensing that the user's hand is held in front of the left infrared LED 106L, the gesture sensing section 101 issues the "sensing left" sensor event to the device control section 102. When receiving no other sensor event for a prescribed time duration, for example, at least 1 second, after receiving the "sensing left" sensor event, the device control section 102 determines that the user's hand is fixed in front of the left infrared LED 106L. In this embodiment, as an operation corresponding to such a fixed state, a process of decreasing the volume of the sound which is output from the speaker 105 is performed. Until receiving the "not sensing" sensor event from the gesture sensing section, the device control section 102 repeats the operation corresponding to the fixed state in front of the left infrared LED 106L at an interval of a prescribed time duration, for example, every second. Namely, the device control section 102 keeps decreasing the volume of the sound which is output from the speaker 105.

(3) "Not Sensing" Sensor Event

When the hand is distanced away from the right or left infrared LED 106L and thus the infrared sensor 107 cannot sense the infrared rays, the gesture sensing section 101 issues the "not sensing" sensor event to the device control section 102. After receiving the "sensing right" sensor event or the "sensing left" sensor event until receiving the "not sensing" sensor event, the device control section 102 determines that the hand is being detected.

(4) "Moving from Left to Right" Sensor Event

When the user moved his/her hand from the left infrared LED 106L to the right infrared LED 106R, the gesture sensing section 101 issues the "sensing left" sensor event and then issues the "moving from left to right" sensor event to the device control section 102.

When receiving the "moving from left to right" sensor event within less than 1 second after, receiving the "sensing left" sensor event from the gesture sensing section 101, the device control section 102 determines that the hand moved from left to right. In this embodiment, as an operation corresponding to the movement from left to right, a process of selecting a subsequent channel is performed.

While the user fixed his/her hand in front of the left infrared LED 106L to decrease the volume of the sound output from the speaker 105, the user may feel that the sound volume is too small and move the hand rightward to make the "fixed" gesture in front of the right infrared LED 106R. In this case, the gesture sensing section 101 issues the "moving from left to right" sensor event to the device control section 102. If, at this point, the device control section 102 determines that the hand moved to the right infrared LED 106R, channel selection which is not intended by the user is performed although the user is making an operation regarding the sound volume by the gesture. In this embodiment, in order to prevent a gesture operation not intended by the user from being performed, the device control section 102 does not perform a process corresponding to the movement, namely, a process of channel selection even if receiving the "moving from left to right" sensor event from the gesture sensing section 101 while the motion of the hand is recognized as the "fixed" gesture. Owing to this, channel change not intended by the user does not occur.

The user may move the hand from the left infrared LED 106L to the right infrared LED 106R many times to perform the "moving" gesture continuously and thus to select the subsequent channels one after another. In this case, the hand which has moved to the right infrared LED 106R needs to be returned to the left infrared LED 106L. The gesture sensing section 101 senses the motion of returning the hand to the left infrared LED 106L and issues the "moving from right to left" sensor event to the device control section 102. If, at this point, the device control section 102 determines that the hand moved to the left infrared LED 106L, a channel selection operation to the previous channel which is not intended by the user is performed. As a result, the channel selection between two channels is repeated instead of the subsequent channels being selected one after another. In order to prevent the channel selection to the previous channel which is not intended by the user from being performed, the device control section 102 is arranged as follows. When the device control section 102, while recognizing the motion of the hand as the "moving" gesture upon receipt of the "moving from left to right" sensor event, receives the "moving from right to left" sensor event, which is in the opposite direction, from the gesture sensing section 101, the device control section 102 does not select the previous channel. Owing to this, channel selection not intended by the user does not occur.

(5) "Moving from Right to Left" Sensor Event

When the user moved his/her hand from the right infrared LED 106R to the left infrared LED 106L, the gesture sensing section 101 issues the "sensing right" sensor event and then issues the "moving from right to left" sensor event to the device control section 102.

When receiving the "moving from right to left" sensor event within less than 1 second after receiving the "sensing right" sensor event from the gesture sensing section 101, the device control section 102 determines that the hand moved from right to left. In this embodiment, as an operation corresponding to the movement from right to left, a process of selecting a previous channel is performed.

While the user fixed his/her hand in front of the right infrared LED 106R to increase the volume of the sound output from the speaker 105, the user may feel that the sound volume is too large and move the hand leftward to make the "fixed" gesture in front of the left infrared LED 106L. In this case, the gesture sensing section 101 issues the "moving from right to left" sensor event to the device control section 102. If, at this point, the device control section 102 determines that the hand moved to the left infrared LED 106L, channel selection which is not intended by the user is performed although the user is making an operation regarding the sound volume by the gesture. In this embodiment, in order to prevent a gesture operation not intended by the user from being performed, the device control section 102 does not perform a process corresponding to the movement, namely, a process of channel selection even if receiving the "moving from right to left" sensor event from the gesture sensing section 101 while the motion of the hand is recognized as the "fixed" gesture. Owing to this, channel change not intended by the user does not occur.

The user may move the hand from the right infrared LED 106R to the left infrared LED 106L many times to perform the "moving" gesture continuously and thus to select the previous channels one after another. In this case, the hand which has moved to the left infrared LED 106L needs to be returned to the right infrared LED 106R. The gesture sensing section 101 senses the motion of returning the hand to the right infrared LED 106R and issues the "moving from left to right" sensor event to the device control section 102. If, at this point, the device control section 102 determines that the hand moved to the right infrared LED 106R, a channel selection operation to the subsequent channel which is not intended by the user is performed. As a result, the channel selection between two channels is repeated instead of the previous channels being selected one after another. In order to prevent the channel selection to the subsequent channel which is not intended by the user from being performed, the device control section 102 is arranged as follows. When the device control section 102, while recognizing the motion of the hand as the "moving" gesture upon receipt of the "moving from right to left" sensor event, receives the "moving from left to right" sensor event, which is in the opposite direction, from the gesture sensing section 101, the device control section 102 does not select the subsequent channel. Owing to this, channel selection not intended by the user does not occur.

Now, a feedback screen which provides a sense of operation when the "fixed" or "moving" gesture is made will be described. As the feedback screen, the following three are prepared in accordance with the position or motion of the hand.

(1) Feedback Screen at the Time of Reaction of the Infrared Sensor

When an operation of holding a hand in front of either one of the two infrared LEDs 106L and 106R is made, the device control section 102 receives a signal indicating that one of the two infrared of the. LEDs 106L and 106R has been detected from the gesture sensing section 101. Thus, the device control section 102 determines that the hand has been detected and displays a feedback screen as shown in FIG. 5(a). This avoids the situation that when the user holds his/her hand in front of either one of the two infrared LEDs 106L and 106R in order to make the "fixed" gesture, the user needs to keep holding the hand for 1 second and for this time duration, cannot obtain a sense of operation that he/she is making an operation of holding the hand, which causes the user to feel uncertain if the infrared sensor 107 is reacting or will react. This feedback screen is displayed while the hand is sensed by the gesture sensing section 101.

As shown in FIG. 5(a), the feedback screen at the time of reaction of the infrared sensor includes information 108 explicitly indicating the detection of the hand and a space 109 for displaying a process corresponding to a motion of the hand which may occur in the future. While the feedback screen at the time of reaction of the infrared sensor is displayed, the operation of the user has not been confirmed. Therefore, the feedback screen at the time of reaction of the infrared sensor includes the space 109 for displaying a process corresponding to a motion of the hand which may occur in the future, so that flicker of the screen is prevented.

As shown in FIGS. 5(b), 9 and 10, the device control section 102 may display information 112 indicating the positions of the two infrared LEDs 106L and 106R, namely, the first position 103L and the second position 103R (FIG. 2) in the display area 103b of the display 103. Owing to this, even in the case where the two infrared LEDs 106L and 106R are provided at positions slightly far from the corners of the frame 103a as shown in FIG. 2, the user can easily see the position at which his/her hand should be held or to which position his/her hand should be moved in order to make the fixed or moving gesture. Therefore, the operation on the information processing device 11 by the motion of the hand can be improved.

(2) Feedback Screen of the "Moving" Gesture

Upon determining that the motion of the hand is the "moving" gesture, the device control device 102 additionally provides display indicating "moving" in the space 109 of the feedback screen at the time of reaction of the infrared sensor, which is already displayed on the display 103. As a result, a feedback screen of the "moving" gesture as shown in FIG. 6(a) or 6(b) is displayed. More specifically, as shown in FIG. 6(a), the device control device 102 displays information 110u, indicating that the next broadcast is selected in a prescribed direction, in the display area 103b over the information 108 indicating the detection of the hand and the space 109. Alternatively, as shown in FIG. 6(b), the device control device 102 displays information 110d, indicating that the next broadcast is selected in a prescribed direction, in the display area 103b over the information 108 indicating the detection of the hand and the space 109.

Figure 5:
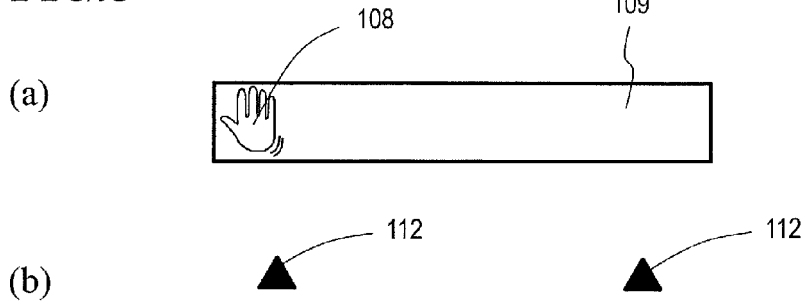
FIGS. 5(a) and 5(b) each show an example of feedback screen at the time of reaction of an infrared sensor.
Figure 6:
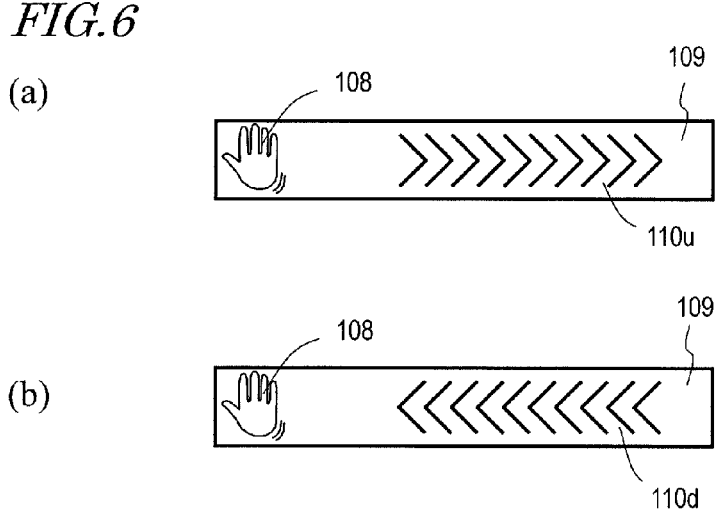
FIGS. 6(a) and 6(b) each show an example of feedback screen of the "moving" gesture.
Figure 7:
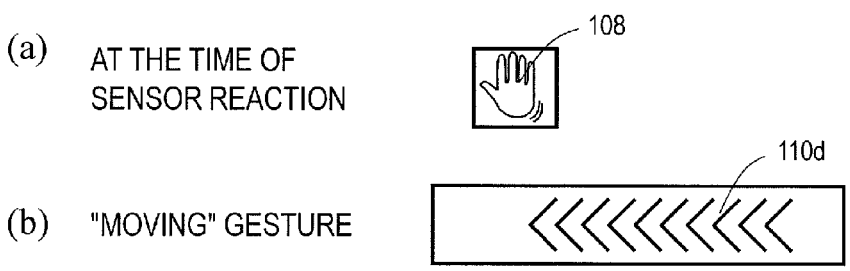
FIGS. 7(a) and 7(b) show feedback screens in the case where the feedback screen at the time of reaction of the infrared sensor and the feedback screen of a "moving" gesture are different from each other.

The user can make the "moving" gesture without checking the feedback screen at the time of reaction of the infrared sensor shown in FIG. 5. If, for example, as shown in FIGS. 7(a) and 7(b), the feedback screen at the time of reaction of the infrared sensor including the information 108 indicating the detection of the hand (FIG. 7(a)), and the feedback screen of the "moving" gesture including the information 110d indicating the next broadcast is selected in a prescribed direction (FIG. 7(b)), are of totally different from each other, the feedback screen at the time of reaction of the infrared sensor (FIG. 7(a)) is displayed for an instant and then the feedback screen of the "moving" gesture is displayed immediately. This causes a flicker of the screen. In order to avoid this, as described above, the space 109 is provided in advance in the feedback screen at the time of reaction of the infrared sensor so that the information on the confirmed gesture is additionally provided. In this case, the two feedback screens are the same except for the space 109. Thus, even when the feedback screen of the "moving" gesture in FIG. 6 is displayed, the flicker of the screen is prevented.

This will be described more specifically. As shown in FIG. 10(a), when the user holds his/her hand in front of the left infrared LED 106L in the state where a selected broadcast is displayed in the display area 103b of the display, the gesture sensing section 101 detects the hand. Based on the output of the gesture sensing section 101, the device control section 102 displays the information 108 indicating the detection of the hand and the space 109 in the display area 103b while the hand is detected. As described above, the information 112 indicating the positions of the infrared LEDs 106L and 106R is also displayed.

When the user moves his/her hand from the left infrared LED 106L to the right infrared LED 106R within a prescribed time duration, the gesture sensing section 101 detects the movement of the hand from the first position to the second position. Based on the detection result, the device control section 102 controls the tuner 104 to select the next broadcast station (channel) in a prescribed direction (e.g., direction in which the channel number is increased), and to display a video of the broadcast of the selected next broadcast station in the display area 103b and output a sound of the broadcast of the selected next broadcast station from the speaker 105. The device control section 102 also displays the information 108 indicating the detection of the hand and the information 110u indicating that the next broadcast station is selected in the prescribed direction in the display area 103b. The information 110u is displayed over the space 109. The information 108 indicating the detection of the hand and the information 110u, displayed over the space 109, indicating that the next broadcast station is selected in the prescribed direction may be kept displayed for a while after the switching to the next broadcast station (display and sound) is completed. For example, such information may be displayed for about 3 seconds. Owing to this, the user visually recognizes that an operation is performed by the gesture and obtains a high sense of operation.

At the time of switching the broadcast, the device control section 102 may output, from the speaker 105, an operation sound indicating the switching to the selected broadcast (station). In this case, for example, if the operation sound is of a rising musical scale, the user can aurally perceive easily that the channel has been switched in the direction in which the channel number is increased, and obtains a higher sense of operation.

For switching the channel in the opposite direction, for example, in a direction in which the channel number is decreased, the operation is made in substantially the same manner. As shown in FIG. 10(b), when the user holds his/her hand in front of the right infrared LED 106R in the state where a selected broadcast is displayed in the display area 103*b* of the display, the gesture sensing section 101 detects the hand. Based on the output of the gesture sensing section 101, the device control section 102 displays the information 108 indicating the detection of the hand and the space 109 in the display area 103*b* while the hand is detected. As described above, the information 112 indicating the positions of the infrared LEDs 106L and 106R is also displayed.

When the user moves his/her hand from the right infrared LED 106R to the left infrared LED 106L within a prescribed time duration, the gesture sensing section 101 detects the movement of the hand from the second position to the first position. Based on the detection result, the device control section 102 controls the tuner 104 to select the next broadcast station in the direction opposite to the prescribed direction (e.g., to select in the direction in which the channel number is decreased), and to display a video of the broadcast of the selected next broadcast station in the display area 103*b* and output a sound of the broadcast of the selected next broadcast station from the speaker 105. The device control section 102 also displays the information 108 indicating the detection of the hand and the information 110*d* indicating that the next broadcast station is selected in the direction opposite to the prescribed direction in the display area 103*b*. The information 110*d* is displayed over the space 109. The information 108 indicating the detection of the hand and the information 110*d*, displayed over the space 109, indicating that the next broadcast station is selected in the direction opposite to the prescribed direction may be kept displayed for a while after the switching to the next broadcast station (display and sound) is completed. For example, such information may be displayed for about 3 seconds. Owing to this, the user visually recognizes that an operation is performed by the gesture and obtains a high sense of operation.

At the time of switching the broadcast, the device control section 102 may output, from the speaker 105, an operation sound indicating the switching to the selected broadcast (station). In this case, if the operation sound is different from the sound output when the broadcast is switched in the prescribed direction, for example, if the operation sound is of a falling musical scale, the user can aurally perceive easily that the channel has been switched in the direction in which the channel number is decreased, and obtains a higher sense of operation.

(3) Feedback Screen of the "Fixed" Gesture

Figure 8:
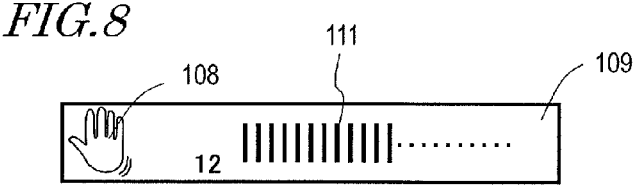
FIG. 8 is an example of feedback screen of a "fixed" gesture.

Upon determining that the motion of the hand is the "fixed" gesture, the device control device 102 provides a feedback screen as shown in FIG. 8 in the display area 103*b*. In this feedback screen, information 111 indicating that the sound volume is increasing or decreasing is displayed over the space 109 of the feedback screen at the time of reaction of the infrared sensor, which is already displayed on the display 103.

This will be described more specifically. As shown in FIG. 9(*a*), when the user holds his/her hand in front of the left infrared LED 106L in the state where a selected broadcast is displayed in the display area 103*b* of the display, the gesture sensing section 101 detects the hand. Based on output of the gesture sensing section 101, the device control section 102 displays the information 108 indicating the detection of the hand and the space 109 in the display area 103*b* while the hand is detected. As described above, the information 112 indicating the positions of the infrared LEDs 106L and 106R is also displayed.

When the user fixed (kept still) his/her hand for a prescribed time duration, the gesture sensing section 101 detects that the hand is "fixed". Based on the detection result, the device control section 102 increases the volume of the sound of the selected broadcast while it is detected that the hand is fixed. The device control section 102 also displays the information 108 indicating the detection of the hand and the information 111 indicating the sound volume at the time in the display area 103*b*. The information 111 is displayed over the space 109. As described above, it is detected that the hand is "fixed" every second and the sound volume is decreased at a prescribed ratio. The information 108 indicating the detection of the hand and the information 111, displayed over the space 109, indicating the sound volume at the time may be kept displayed for a while after the hand is distanced from the left infrared LED 106L and the gesture sensing section 101 stops detecting the hand. For example, such information may be displayed for about 3 seconds. Owing to this, the user visually recognizes that an operation is performed by the gesture and obtains a high sense of operation.

Before decreasing the sound volume, the device control section 102 may output an operation sound from the speaker 105. Owing to this, the user can recognize that the sound volume is changed before the change of the sound volume occurs, and obtains a higher sense of operation.

For increasing the sound volume, the operation is made in substantially the same manner. As shown in FIG. 9(*b*), when the user holds his/her hand in front of the right infrared LED 106R in the state where a selected broadcast is displayed in the display area 103*b* of the display, the gesture sensing section 101 detects the hand. Based on the output of the gesture sensing section 101, the device control section 102 displays the information 108 indicating the detection of the hand and the space 109 in the display area 103*b* while the hand is detected. As described above, the information 112 indicating the positions of the infrared LEDs 106L and 106R is also displayed.

When the user fixed (kept still) his/her hand for a prescribed time duration, the gesture sensing section 101 detects the hand is "fixed". Based on the detection result, the device control section 102 increases the volume of the sound of the selected broadcast while it is detected that the hand is fixed. The device control section 102 also displays the information 108 indicating the detection of the hand and the information 111 indicating the sound volume at the time in the display area 103*b*. The information 111 is displayed over the space 109. As described above, it is detected that the hand is "fixed" every second and the sound volume is increased at a prescribed ratio. The information 108 indicating the detection of the hand and the information 111, displayed over the space 109, indicating the sound volume at the time may be kept displayed for a while after the hand is distanced from the right infrared LED 106R and the gesture sensing section 101 stops detecting the hand. For example, such information may be displayed for about 3 seconds. Owing to this, the user visually recognizes that an operation is performed by the gesture and obtains a high sense of operation.

Before increasing the sound volume, the device control section 102 may output an operation sound from the speaker 105. Owing to this, the user can recognize that the sound volume is changed before the change of the sound volume occurs, and obtains a higher sense of operation.

So far, an information processing device in this embodiment has been described with reference to the figures. The information processing device according to the present invention is not limited to the above-described embodiment. For example, in the above-described embodiment, the gesture sensing section 101 detects the hand, and the position and motion of the hand, by use of infrared rays. Alternatively, any other method using ultrasound, electrostatic capacitance or the like is usable to detect the hand, and the position and motion of the hand. The transmission section and the receiving section of signals used for the detection are provided at positions in the frame that are above the display area. Alternatively, the transmission section and the receiving section of signals used for the detection may be located at other positions in the frame or at any other positions outside the frame. The number of the transmission and receiving sections used for the detection may be different from that in the above-described embodiment.

An information processing device according to the present invention is operable especially in a non-contact state. Therefore, the information processing device according to the present invention is preferably usable in an environment of use in which the user's hand is wet with water or any other liquid or is not clean, or in an environment of use in which the user wears a glove or the like and cannot make a precise movement or the hand is not easily detectable when contacting the information processing device.

There is no specific limitation on the size of the information processing device or the gesture sensing section. The present invention can be realized as an information processing device of any of various sizes as long as it can be distinguished whether the hand is fixed or moving. Specifically, the present invention is preferably usable for an information processing device having approximately a size of a digital photoframe or a tablet computer or larger.

Industrial Applicability

The present invention can provide an information processing device which recognizes a motion of a hand as a gesture by use of a non-contact sensor and is operable based on the gesture as the recognition result. Therefore, the present invention is applicable to electronic devices such as TVs, digital photoframes and the like having a non-contact sensor mounted thereon.

Reference Signs List

101 Gesture sensing section
102 Device control section
103 Display
103a Frame
103b Display area
104 Tuner
105 Speaker
106L, 106R Infrared LED
107 Infrared sensor
108 Information indicating the detection of a hand
109 Space

The invention claimed is:

1. An information processing device operable by a motion of a hand, the information processing device comprising:
   a display section including a display area and a frame located around the display area;
   a detection section provided in the frame for detecting the hand and a motion of the hand; and
   a control section for, while determining that the detection section is detecting the hand based on an output result of the detection section, displaying information indicating the detection of the hand in the display area of the display section, and also displaying information corresponding to the motion of the hand within a prescribed time duration after the hand starts to be detected in the display area of the display section while controlling a target device in accordance with the motion of the hand;
   when the control section keeps performing the process corresponding to the motion of the hand being stopped, then the detection section detects a motion of the hand, and then the control section determines that the motion of the hand is stopped at a different position, the control section does not consider the motion of the hand detected by the detection section;
   wherein the information processing device further comprises a speaker for outputting a sound;
   the target device is a tuner for receiving a TV broadcast;
   the control section controls the tuner to select a prescribed TV broadcast, to display a video of the selected broadcast in the display area of the display section, and to output a sound of the selected broadcast from the speaker;
   the detection section detects that the hand is still at either one of a first position in the frame and a second position in the frame distanced from the first position for a prescribed time duration, or detects that the hand moved from one of the first position and the second position to the other of the first position and the second position within the prescribed time duration;
   when the detection section detects that the hand is still at the first position in the frame for the prescribed time duration, the control section increases a sound volume of a sound of the selected broadcast and displays information indicating the sound volume at the time in the display area while it is detected by the detection section that the hand is still; and
   when the detection section detects that the hand is still at the second position in the frame for the prescribed time duration, the control section decreases the sound volume of the sound of the selected broadcast and displays information indicating the sound volume at the time in the display area while it is detected by the detection section that the hand is still.

2. The information processing device of claim 1, wherein when the detection section stops detecting the hand within the prescribed time duration, the control section stops displaying the information indicating the detection of the hand, which has been displayed in the display area of the display section.

3. The information processing device of claim 1, wherein:
   when the detection section detects that the hand moved from the first position to the second position within the prescribed time duration, the control section controls the tuner to select a next broadcast station in a prescribed direction, to display a video of a broadcast by the selected next broadcast station in the display area of the display section, to output a sound of the broadcast by the selected next broadcast station from the speaker, and to display information indicating that the next broadcast station is selected in the prescribed direction in the display area; and
   when the detection section detects that the hand moved from the second position to the first position within the prescribed time duration, the control section controls the tuner to select a next broadcast station in a direction opposite to the prescribed direction, to display a video of a broadcast by the selected next broadcast station in the display area of the display section, to output a sound of the broadcast by the selected next broadcast station from the speaker, and to display information indicating that the next broadcast station is selected in the direction opposite to the prescribed direction in the display area.

4. The information processing device of claim 3, wherein the detection section detects, after the detection of the movement of the hand is finished, that the hand moved in a direction opposite to the direction of the first movement in a prescribed time period, the control section does not control the tuner in correspondence with the movement in the opposite direction.

5. The information processing device of claim 1, wherein:
when displaying the information indicating the detection of the hand in the display area, the control section further displays a space adjacent to the information indicating the detection of the hand; and
the control section displays, at the same position as the space in the display area, either one of the information indicating the sound volume at the time, the information indicating that the next broadcast station is selected in the prescribed direction, and the information indicating that the next broadcast station is selected in the direction opposite to the prescribed direction.

6. The information processing device of claim 1, wherein while the hand is detected by the detection section, the control section displays information indicating the first position and the second position in the display area.

7. The information processing device of claim 1, wherein when displaying the information indicating that the next broadcast station is selected in the prescribed direction or the information indicating that the next broadcast station is selected in the direction opposite to the prescribed direction, the control section outputs one of a plurality of different operation sounds from the speaker in accordance with the direction in which the next broadcast station is selected.

8. The information processing device of claim 1, wherein when increasing or decreasing the sound volume of the sound of the broadcast of the selected broadcast station, the control section outputs an operation sound from the speaker.

9. The information processing device of claim 1, wherein the detection section includes infrared light emitting elements respectively provided at the first position and the second position in the frame, and an infrared detector provided between the first position and the second position in the frame.

* * * * *